(12) United States Patent
Ichikawa et al.

(10) Patent No.: US 9,087,513 B2
(45) Date of Patent: Jul. 21, 2015

(54) NOISE REDUCTION METHOD, PROGRAM PRODUCT, AND APPARATUS

(71) Applicant: International Business Machines Corporation, Armonk, NY (US)

(72) Inventors: Osamu Ichikawa, Tokyo (JP); Steven Rennie, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/792,310

(22) Filed: Mar. 11, 2013

(65) Prior Publication Data
US 2013/0185067 A1    Jul. 18, 2013

(30) Foreign Application Priority Data
Mar. 9, 2012   (JP) ................................ 2012-052565

(51) Int. Cl.
*G10L 15/20* (2006.01)
(52) U.S. Cl.
CPC ..................... *G10L 15/20* (2013.01)
(58) Field of Classification Search
USPC ................................................ 704/226, 233
See application file for complete search history.

(56) References Cited

U.S. PATENT DOCUMENTS

| 2004/0052383 A1 | 3/2004 | Acero |
| 2012/0136655 A1 | 5/2012 | Yamabe |

FOREIGN PATENT DOCUMENTS

| JP | 2008298844 | 12/2008 |
| WO | WO 00/46788 A1 * | 8/2000 |

OTHER PUBLICATIONS

Souden et al.; AMultichannel MMSE-Based Framework for Speech Source Separation and Noise Reduction; IEEE Transactions on Audio, Speech, and Language Processing, vol. 21. No. 9, Sep. 2013, pp. 1913-1928.*
Ichikawa, Osamu, et al. "DOA Estimation with Local-Peak-Weighted CSP". EURASIP Journal on Advances in Signal Processing, Aug. 1, 2009, pp. 1-8.
Ichikawa, Osamu, et al. "Local Peak Enhancement Combined with Noise Reduction Algorithms for Robust Automatic Speech Recognition in Automobiles", pp. 1-4.
Moreno, Pedro J., et al. "A Vector Taylor Series Approach for Environment-Independent Speech Recognition", pp. 1-4.
Rennie, Steven, J. et al. "Single-Channel Multitalker Speech Recognition", IEEE Signal Processing Magazine, pp. 66-80, Nov. 2011.
Segura, J.C., et al, "Model-based compensation of the additive noise for continuous speech recognition. Experiments using the AURORA II database and tasks", Eurospeech 2001, pp. 1-4.
Fukada, Takashi, et al. "Improved Voice Activity Detection Using Static Harmonic Features,", IEEE ICASSP 2010, pp. 4482-4485, Jun. 2010.

* cited by examiner

*Primary Examiner* — Abul Azad
(74) *Attorney, Agent, or Firm* — Jennifer R. Davis; Anne Vachon Dougherty (57) ABSTRACT

A probability model represented as the product of the probability distribution of a mismatch vector g (or clean speech x) with an observed value y as a factor and the probability distribution of a mismatch vector g (or clean speech x) with a confidence index β for each band as a factor, executes MMSE estimation on the probability model, and estimates a clean speech estimated value x^. As a result, each band influences the result of MMSE estimation, with a degree of contribution in accordance with the level of its confidence. Further, the higher the S/N ratio of observation speech, the more the output value becomes shifted to the observed value. As a result, the output of a front-end is optimized.

9 Claims, 5 Drawing Sheets

NOISE REDUCTION METHOD, PROGRAM PRODUCT, AND APPARATUS

The present invention relates to speech recognition technology, and more specifically, it relates to noise reduction technology.

BACKGROUND OF THE INVENTION

In speech recognition technology, removal of effects of background noise is a matter of concern that is important in improving the accuracy of utterance recognition. Filtering techniques of the related art (such as a spectral subtraction method and the Wiener filtering) have a measure of success when background noise is relatively small, but fail to achieve desired results over large background noise since targeted speech sinks into the noise.

To this end, attention has been paid in recent years to approaches that use a probability model of clean speech (utterance speech on which no noise whatsoever is superimposed). These model-based noise reduction methods have been reported to show high performance even over loud background noise. With this regard, Japanese Patent Application Publication No. 2008-298844 (Patent Literature 1) discloses a speech recognition system adopting model-based noise reduction.

SUMMARY OF INVENTION

An object of the present invention is to provide a novel noise reduction method applied to a speech recognition front-end.

The inventors have diligently examined a novel noise reduction method applied to a speech recognition front-end, and as a result, conceived a configuration that utilizes a factor model incorporating a confidence index for each band of observation speech, thereby accomplishing the present invention.

That is, according to the present invention, there is provided a noise reduction method including: the step of generating a confidence index for each band on the basis of a spectrum of observation speech; the step of generating a probability model represented as a mixture multi-dimensional normal distribution having a dimension for each band, each normal distribution being represented as a product of a first normal distribution and a second normal distribution; and the step of estimating a mismatch vector estimated value by executing MMSE estimation on the probability model, and deriving a clean speech estimated value on the basis of the mismatch vector estimated value. The first normal distribution is a probability distribution of a mismatch vector generated on the basis of the observation speech. The second normal distribution is defined as a function having a zero mean and outputting a variance that becomes a smaller value as the confidence index becomes greater.

Also, according to the present invention, there is provided a noise reduction method including: the step of generating a confidence index for each band on the basis of a spectrum of observation speech; the step of generating a probability model represented as a mixture multi-dimensional normal distribution having a dimension for each band, each normal distribution being represented as a product of a first normal distribution and a second normal distribution; and the step of deriving a clean speech estimated value by executing MMSE estimation on the probability model. The first normal distribution is a probability distribution of clean speech generated on the basis of the observation speech. The second normal distribution is defined as a function having an observed value as a mean and outputting a variance that becomes a smaller value as the confidence index becomes greater.

Further, according to the present invention, there is provided a computer program product for causing a computer to execute each of the methods, and a noise reduction apparatus implementing functions for realizing each of the methods.

As described above, according to the present invention, the output of the front-end is optimized by utilizing a factor model incorporating a confidence index for each band of observation speech.

DETAILED DESCRIPTION OF THE INVENTION

Hereinafter, the present invention will be described with reference to an embodiment illustrated in the drawings. However, the present invention is not limited to the embodiment illustrated in the drawings. Note that, in the drawings to be referred to below, common elements are given the same reference numerals, and descriptions thereof are appropriately omitted.

In general, a speech recognition system includes a front-end that applies certain conversion to an acoustic signal of uttered speech to extract a feature amount, and a back-end that searches a database on the basis of the feature amount, which is extracted in the front-end, to specify the contents of the utterance. The present invention provides a novel technique that utilizes a factor model incorporating a confidence index of the spectrum of observation speech for model-based noise compensation applied to the front-end.

Model-Based Noise Compensation

Before starting the description of the embodiment of the present invention, model-based noise compensation applied to the front-end will be described on the basis of FIG. 1. Note that, in the following description, "observation speech" refers to the actual observed sound in which background noise is superimposed on utterance speech; "clean speech" refers to utterance speech on which no noise whatsoever is superimposed; and a "clean speech estimated value" refers to an estimated value of clean speech estimated from the observation speech. Also, a "frequency spectrum" refers to a power spectrum or an amplitude spectrum.

Model-based noise compensation is, in short, technology of modeling clean speech x as a probability distribution $p(x|y)$ of x when an observed value y is given, and estimating an estimated value of the clean speech x from the probability model $p(x|y)$. MMSE estimation is elemental technology used in estimation at a subsequent stage.

Figure 1:
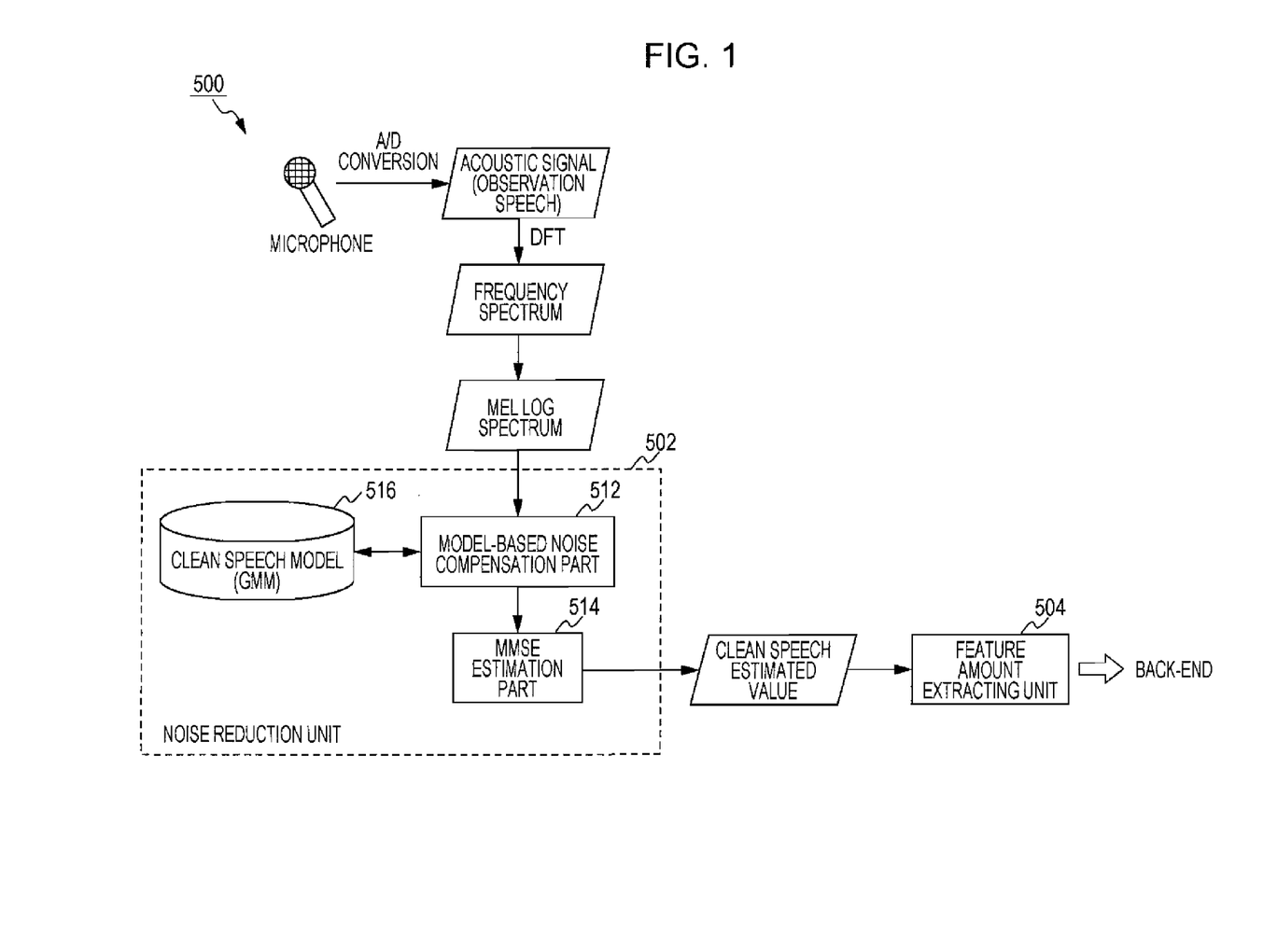
FIG. 1 is a conceptual diagram illustrating the configuration of a front-end in a speech recognition system of the related art.

FIG. 1 conceptually illustrates the configuration of a front-end 500 in a speech recognition system of the related art to which model-based noise compensation is applied.

Observation speech collected and recorded with a microphone is converted by an A/D converter to a digital signal (acoustic signal). Thereafter, the digital signal is subjected to framing and discrete Fourier transform (DFT) using an appropriate window function, which is then converted to a frequency spectrum for each frame. Next, the frequency spectrum is subjected to a mel filter bank (a filter bank in which band-pass filters are arranged at equal intervals on the mel scale), and the logs thereof are taken, which are then converted to a mel log spectrum and input to a noise reduction unit 502.

The noise reduction unit 502 includes a model-based noise compensation part 512, an MMSE estimation part 514, and a database 516 that stores a Gaussian mixture model (hereinafter referred to as a GMM) of clean speech. On the basis of the input mel log spectrum, the noise reduction unit 502 generates a clean speech estimated value for each frame, and outputs the clean speech estimated value to a feature amount extracting unit 504.

The model-based noise compensation part 512 is a function part that represents clean speech included in observation speech as a probability distribution, and is implemented by an existing modeling algorithm, such as VTS, SPLICE, DNA, or Segura. The model-based noise compensation part 512 executes a certain arithmetic operation by using the mel log spectrum for each frame, which is input to the noise reduction unit 502, and the clean speech model (GMM) stored in the database 516, and outputs the clean speech included in the observation speech as a mixture multi-dimensional normal distribution with a dimension for each band.

The MMSE estimation part 514 executes MMSE estimation based on the probability distribution output from the model-based noise compensation part 512, and generates a clean speech estimated value. Note that the clean speech model stored in the database 516 is a GMM in the mel log spectrum domain, which is generated for each phoneme on the basis of prior leaning. The model-based noise compensation part 512 outputs clean speech as a GMM in the mel log spectrum domain. The MMSE estimation part 514 generates a clean speech estimated value as a vector in the mel log spectrum domain.

The feature amount extracting unit 504 extracts a certain feature amount such as a mel frequency cepstrum coefficient (MFCC) from the clean speech estimated value output from the MMSE estimation part 514, and sends the feature amount to the back-end. In the back-end, the contents of the utterance are specified on the basis of the feature amount received from the front-end, by using an existing configuration such as an HMM, an acoustic model, or an N-gram language model.

The configuration of the front-end in the speech recognition system of the related art has been briefly described above. Next, the existing MMSE estimation will be described in detail. Model-based noise compensation algorithms of the related art include a first method of directly estimating a clean speech estimated value from observation speech, which has been described above, and a second method of estimating a compensation amount from observation speech and deriving a clean speech estimated value from the difference between the observation speech and an estimated value of the compensation amount. In the second method, MMSE estimation is used in estimating a compensation amount (mismatch vector). The following description will be based on the second method, which is adopted by Segura, in order to simplify the description.

Existing MMSE Estimation

An observed value $y_d(t)$ in the mel log spectrum domain of a band d (frequency band on the mel-scale) in a frame t of observation speech y can be expressed as a function of a clean speech value $x_d(t)$ and a noise value $n_d(t)$ in equation (1) below:

[Eq. 1]

$$y_d(t) = x_d(t) + \log(1 + \exp(n_d(t) - x_d(t))) \quad (1)$$

When t is omitted from equation (1) above and equation (1) is represented as a vector, equation (2) below is obtained:

[Eq. 2]

$$y = x + g \quad (2)$$

A mismatch vector g for each band d is given by a mismatch function G indicated in equation (3) below:

[Eq. 3]

$$g_d = G_d(x, n) = \log(1 + \exp(n_d - x_d)) \quad (3)$$

Here, clean speech x is modeled as a K-mixture GMM indicated in equation (4) below:

[Eq. 4]

$$p(x) = \sum_{k}^{K} \gamma_k \cdot N\left(x; \mu_{x,k}, \sum_{x,k}\right) \quad (4)$$

In equation (4) above, $\gamma_k$, $\mu_{x,k}$, and $\Sigma_{x,k}$ indicate a prior probability, a mean vector, and a covariance matrix, respectively, of a k-th normal distribution.

By using the linear Taylor expansion on the basis of equations (1) to (4) above, the mismatch vector g is modeled as a K-mixture GMM indicated in equation (5) below:

[Eq. 5]

$$p(g) = \sum_{k}^{K} \gamma_k \cdot N\left(g; \mu_{g,k}, \sum_{g,k}\right) \quad (5)$$

Note that the mean vector $\mu_{g,k}$ in equation (5) above is represented as equation (6) below, and the covariance matrix $\Sigma_{g,k}$ is represented as equation (7) below:

[Eq. 6 and 7]

$$\mu_{g,k} \cong \log(1 + \exp(\mu_n - \mu_{x,k})) = G(\mu_{x,k}, \mu_n) \quad (6)$$

$$\Sigma_{g,k} \cong F(\mu_{x,k}, \mu_n)^2 \cdot (\Sigma_{x,k} + \Sigma_n) \quad (7)$$

An auxiliary function F in equation (7) above is defined as equation (8) below:

[Eq. 8]

$$F_d(x, n) = (1 + \exp(x_d - n_d))^{-1} \quad (8)$$

As a result, the clean speech estimated value $\hat{x}$ is given by equation (9-1) below:

[Eq. 9-1]

$$\hat{x} = y - \int g \cdot p(g|y) dg \cong y - \sum_{k}^{K} \rho_k(y) \cdot \mu_{g,k} \quad (9\text{-}1)$$

In contrast, in the first method of directly estimating the clean speech estimated value x^ from the observation speech y, the clean speech estimated value x^ is given by equation (9-2) below instead of equation (9-1) above:

[Eq. 9-2]

$$\hat{x} = \int x \cdot p(x|y) dx \cong \sum_{k}^{K} \rho_k(y) \cdot \mu_{x,k} \qquad (9\text{-}2)$$

Here, posterior probabilities $\rho_k$ in equations (9-1) and (9-2) above are both given by equation (10) below:

[Eq. 10]

$$\rho_k(y) = \gamma_k \cdot N\left(y; \mu_{y,k}, \sum_{y,k}\right) \Big/ \sum_{k'} \gamma_{k'} \cdot N\left(y; \mu_{y,k'}, \sum_{y,k'}\right) \qquad (10)$$

The mean vector $\mu_{y,k}$ in equation (10) above is represented by equation (11) below, and the covariance matrix $\Sigma_{y,k}$ is represented by equation (12) below:

[Eq. 11 and 12]

$$\mu_{y,k} \cong \mu_{x,k} + G(\mu_{x,k}, \mu_n) \qquad (11)$$

$$\Sigma_{y,k} \cong \{1 - F(\mu_{x,k}, \mu_n)^2\} \cdot \Sigma_{x,k} + F(\mu_{x,k}, \mu_n)^2 \cdot \Sigma_n \qquad (12)$$

Note that, in equations (11) and (12) above, speech model parameters [$\mu_{x,k}$, $\Sigma_{x,k}$] are given by prior learning data, and noise model parameters [$\mu_n$, $\Sigma_n$] are set by the model-based noise compensation part 512 on the basis of an observed value in a voiceless section and given to the MMSE estimation part 514.

The existing MMSE has been described above. Next, a new technique of the present invention, which utilizes a factor model incorporating a confidence index of the spectrum of observation speech, will be described. In the following description, this technique is referred to as PCW-MMSE (Probabilistic Confidence Weighted MMSE).

PCW-MMSE

The following description will be based on the second method, which is adopted by Segura, in order to simplify the description. In model-based noise compensation of the above-described second method, the clean speech estimated value x^ is derived using equation (13) below. As indicated in equation (13) below, the probability distribution of a mismatch vector g is generated as a one-factor model p(g|y) of an observation vector y, and MMSE estimation is executed on the generated p(g|y). Thereafter, the estimation result is subtracted from the observed value y, thereby deriving the clean speech estimated value x^.

[Eq. 13]

$$\hat{x} = y - \int g \cdot p(g|y) dg \qquad (13)$$

Regarding this point, the present invention derives the clean speech estimated value x̂ using equation (14) below. That is, in the present invention, a probability distribution serving as a target of MMSE estimation is defined as a two-factor model p(g|y, β) including two factors. Among the two factors here, one is the observation vector y, and the other is the confidence index β.

[Eq. 14]

$$\hat{x} = y - \int g \cdot p(g|y, \beta) dg \qquad (14)$$

Here, the confidence index is an index that represents the confidence of a band. In general, the confidence of a band is evaluated from the viewpoint of signal deterioration caused by background noise. Needless to say, various designs are possible for the confidence index β. The technique of the present invention is not limited to the type of confidence index adopted, and an existing confidence index used in the field of speech recognition can be used. As an existing confidence index, a confidence index utilizing the relative strength of power in a time direction or a frequency direction can be illustrated by way of example.

Here, a novel confidence index devised by the Inventors will be described. It is known that the frequency spectrum of vowels included in human utterance has a harmonic structure. In an environment with no background noise, the harmonic structure of vowels is maintained in the entire band of the frequency spectrum of observation speech. In contrast, over broadband noise such as a vehicle's driving sound or air conditioning sound, the harmonic structure of vowels is lost in many bands, and the harmonic structure is maintained only in a band such as a formant where the speech power is concentrated.

From this point, the Inventors assume that deterioration caused by background noise occurs infrequently in a band with a remarkable harmonic structure, and devises a technique of utilizing the remarkableness of the harmonic structure as a confidence index for that band. According to this technique, even when noise is not constant or when the noise level in a certain band is always high, the confidence of a band can be appropriately evaluated. Hereinafter, a method of generating a novel confidence index, which has been devised by the Inventors, will be described.

A novel confidence index is generated using an LPW (Local Peak Weight). Here, an LPW is such that a great change such as that including formant information is removed from the spectral energy distribution of observation speech, only regular peaks and troughs corresponding to the harmonic structure are extracted, and their values are normalized. An LPW is generated for each frame by performing the following procedure.

Figure 2:
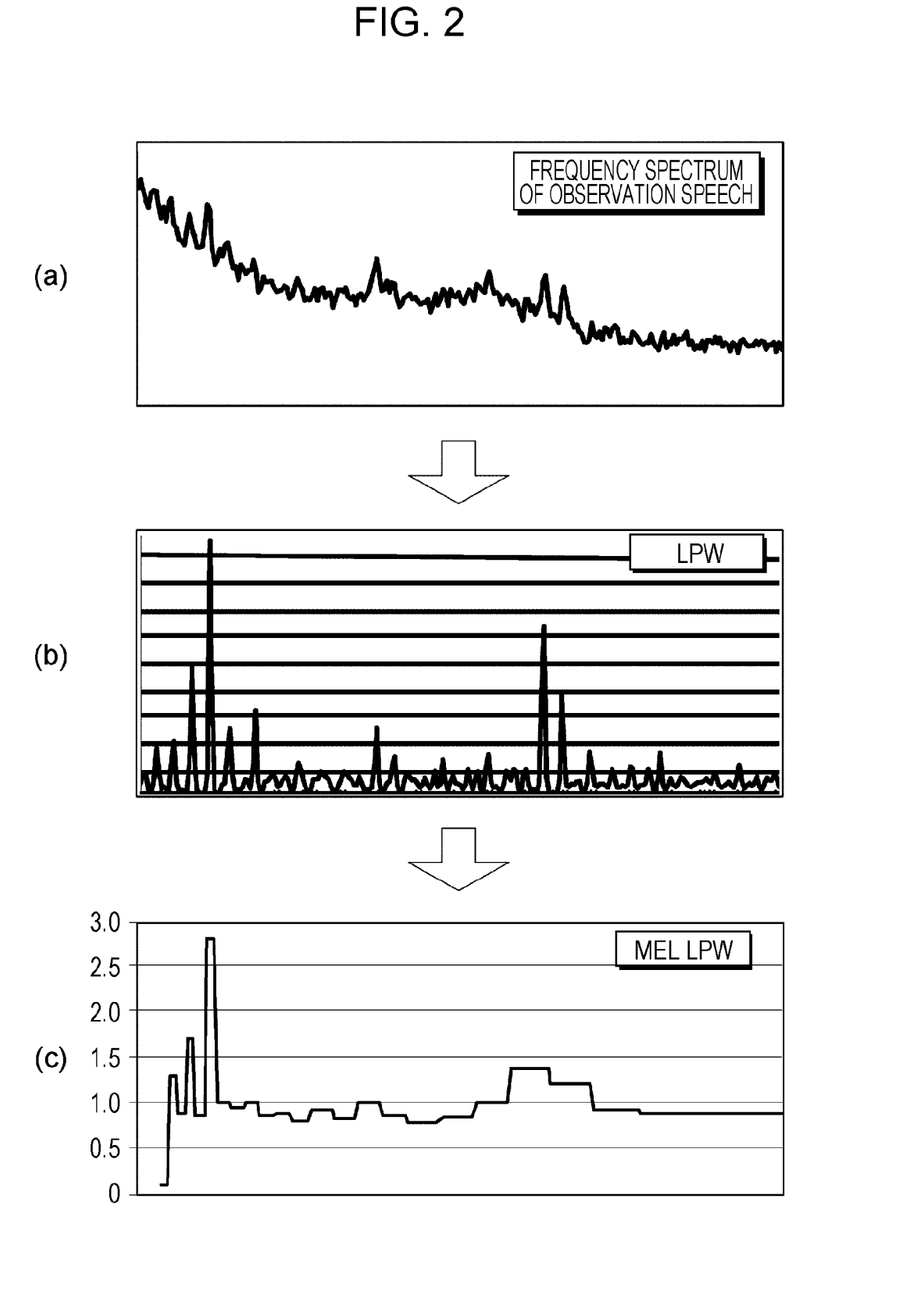
FIG. 2 includes conceptual diagrams illustrating the steps of generating a mel LPW from the frequency spectrum of observation speech.

Firstly, the logarithm of the frequency spectrum of a frame t of observation speech is taken, and its log spectrum is subjected to discrete cosine transform to obtain a cepstrum. Next, among terms of the obtained cepstrum, only terms in a domain(s) corresponding to the harmonic structure of LPW vowels are left, and the other terms are cut. Thereafter, the processed cepstrum is subjected to inverse discrete cosine transform to convert the cepstrum back to the log spectrum domain, which is further converted back to the frequency spectrum domain. Finally, the converted frequency spectrum is normalized so that the mean of the frequency spectrum becomes 1, thereby obtaining an LPW. FIG. 2(*a*) illustrates the frequency spectrum of a frame t of observation speech. FIG. 2(*b*) illustrates an LPW generated on the basis of the frequency spectrum illustrated in FIG. 2(*a*).

Next, a mel LPW illustrated in FIG. 2(*c*) is obtained by smoothing the LPW illustrated in FIG. 2(*b*) on the mel scale. Specifically, values are smoothed by subjecting the LPW to a mel filter bank (a filter bank in which band-pass filters are arranged at equal intervals on the mel scale), and one value is obtained for each mel band. As illustrated in FIG. 2(*c*), the mel LPW value is given in each mel band. The magnitude of the mel LPW value corresponds to the remarkableness of the harmonic structure of a frequency spectrum band at high resolution, which corresponds to each mel band.

In the present embodiment, the mel LPW value obtained by the above-described procedure is normalized by using an appropriate method, and a confidence index $\beta_d$ for each band is obtained. For example, the confidence index $\beta_d$ can be generated by performing the following procedure.

Figure 3:
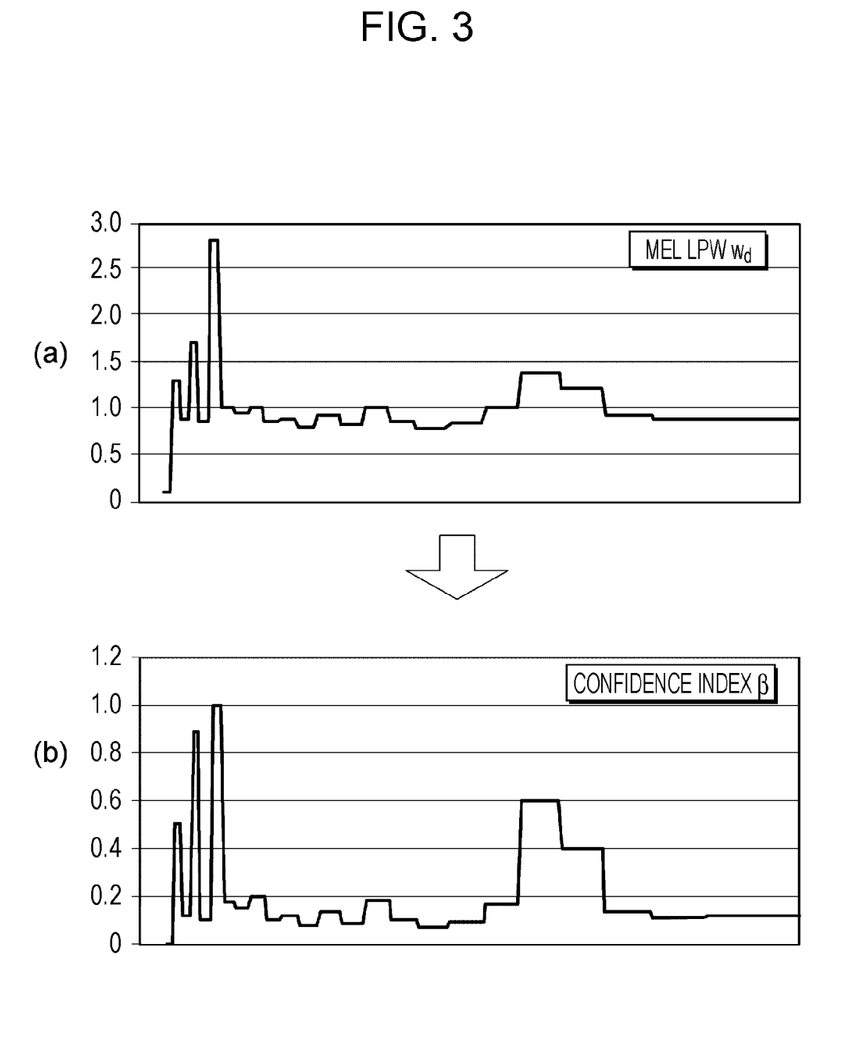
FIG. 3 includes conceptual diagrams illustrating the step of generating a confidence index β from a mel LPW.

FIG. 3(a) illustrates a mel LPW obtained for a frame t. A mel LPW value $w_d$ is normalized by using an appropriate scaling function so that the value $w_d$ takes a value from 0 to 1 where 1 is the maximum value. An example of the scaling function includes a sigmoid function. Equation (15) below indicates an equation for deriving the confidence index $\beta_d$ by using a sigmoid function:

[Eq. 15]

$$\beta_d = 1.0/(1.0 + \exp(-a \cdot (w_d - 1.0 - b))) \quad (15)$$

Note that, in equation (15) above, a and b are tuning parameters, and appropriate constant values are set.

FIG. 3(b) indicates the confidence index $\beta_d$ generated by the above-described procedure. As illustrated in FIG. 3(b), the confidence index $\beta_d$ is given in each mel band. On the assumption of the above-described confidence index $\beta$, the description continues with reference to equation (14) above again.

The probability model $p(g|y, \beta)$ in equation (14) above can be represented as the product of two probability distributions, as indicated in equation (16) below:

[Eq. 16]

$$p(g|y, \beta) = p(g|y) \cdot p(g|\beta) \quad (16)$$

In equation (16) above, $p(g|y)$ can be referred to as the probability model of the mismatch vector g adopted by Segura, which has the observation vector y as a factor.

In contrast, in equation (16) above, $p(g|\beta)$ is the probability model of the mismatch vector g which has the confidence index $\beta$ as a factor. In the present invention, the factor model $p(g|\beta)$ is designed so that, the greater the value of the confidence index $\beta$ becomes, the higher the probability of the mismatch vector g=0 becomes.

That is, the present invention models the factor model $p(g|\beta)$ as a normal distribution represented by equation (17) below, that is, a normal distribution in which the mean is 0 and the variance is an output of the function $\psi(\beta)$:

[Eq. 17]

$$p(g|\beta) = N(g; 0, \psi(\beta)) \quad (17)$$

The present invention adopts, as the function $\psi(\beta)$ in equation (17) above, an appropriate function that outputs a smaller value as the value of the confidence index $\beta$ is greater. For example, the function $\psi(\beta)$ in equation (17) above is considered as k-dependent and is executed by scaling the variance of the k-th normal distribution of the clean speech GMM. In that case, the function $\psi(\beta)$ representing the variance of the k-th normal distribution of the band d can be defined as equation (18) below:

[Eq. 18]

$$\psi_{k,d} = \Sigma_{x,k,d}(\beta_d^{-1} - c) \quad (18)$$

In equation (18) above, $\beta_d$ indicates the confidence index for each band. Also, c is a tuning parameter, and an appropriate constant value in the range from 0.0 to 1.0 is set.

Here, the description continues with reference to equation (16) above again.

For example, when observation speech is hardly deteriorated and the harmonic structure of vowels in the frequency spectrum thereof is remarkable, the confidence index $\beta$ becomes greater. In that case, the variance $\psi(\beta)$ indicated in equation (17) above becomes smaller, and the normal distribution $p(g|\beta)$ has a sharp distribution. As a result, in the probability distribution $p(g|y, \beta)$ represented by the product of $p(g|y)$ and $p(g|\beta)$, the normal distribution $p(g|\beta)$ in which the mean=0 acts dominantly, and the mean of $p(g|y, \beta)$ is shifted in the direction of g=0. As a result, the clean speech estimated value $\hat{x}$ obtained by equation (14) above becomes a value closer to the observed value y than to the output value of the clean speech estimated value $\hat{x}$ of the related art obtained by equation (13) above.

In short, the present invention has the following advantageous effects by adopting the two-factor model $p(g|y, \beta)$ as the probability model serving as a target of MMSE estimation. That is, in a technique of adopting the one-factor model $p(g|y)$ of the related art, no matter how high the S/N ratio of observation speech is, the estimated value of the mismatch vector g is always subtracted, resulting in inconvenience that the speech becomes deteriorated instead. In contrast, according to the present invention, when the S/N ratio of observation speech is very high, the estimated value of the mismatch vector g approaches 0, and its output value becomes substantially equal to the observed value y. This result suits the purpose of noise reduction.

Further, adopting the two-factor model $p(g|y, \beta)$ as the probability model serving as a target of MMSE estimation has the advantageous effect of improving MMSE estimation used at the last stage of estimation of a speech model. Hereinafter, this point will be described.

MMSE estimation of clean speech, which adopts the two-factor model $p(g|y, \beta)$ of the present invention, can be executed by converting equation (16) above to a mixture normal distribution. That is, since the product of a normal distribution and a normal distribution becomes a normal distribution, the probability distribution $p(g|y, \beta)$ can be expanded as equation (19) below:

[Eq. 19]

$$p(g|y, \beta) = \sum_k^K \rho_k''(y) \cdot N\left(g; \mu_{g,k}, \sum_{g,k}\right) \cdot N(g; 0, \psi_k(\beta)) \quad (19)$$

$$= \sum_k^K \rho_k''(y) \cdot N\left(g; \mu_{g,k}'', \sum_{g,k}''\right)$$

The variance $\Sigma''_{g,k}$ and the mean $\mu''_{g,k}$ in equation (19) above are given by equations (20) and (21) below, respectively:

[Eq. 20 and 21]

$$\Sigma''_{g,k} = (\Sigma_{g,k}^{-1} + \psi_k^{-1})^{-1} \quad (20)$$

$$\mu''_{g,k} = (\Sigma_{g,k}^{-1} \cdot \mu_{g,k} + \psi_k^{-1} \cdot 0) \cdot \Sigma''_{g,k} \quad (21)$$

Also, the posterior probability $p''_k(y)$ in equation (19) above is given by equation (22) below:

[Eq. 22]

$$\rho_k''(y) = \gamma_k \cdot N\left(y; \mu_{y,k}'', \sum_{y,k}''\right) \Big/ \sum_{k'} \gamma_{k'} \cdot N\left(y; \mu_{y,k'}'', \sum_{y,k'}''\right) \quad (22)$$

The variance $\Sigma''_{y,k}$ and the mean $\mu''_{y,k}$ in equation (22) above are given by equations (23) and (24) below, respectively:

[Eq. 23 and 24]

$$\Sigma''_{y,k} = (\Sigma_{y,k}^{-1} + \psi_k^{-1})^{-1} \quad (23)$$

$$\mu''_{y,k} = (\Sigma_{y,k}^{-1} \cdot \mu_{y,k} + \psi_k^{-1} \cdot \mu_{x,k}) \cdot \Sigma''_{y,k} \quad (24)$$

Finally, when the two-factor model $p(g|y, \beta)$ serves as a target, the estimated value of MMSE estimation is given by equation (25) below:

[Eq. 25]

$$\hat{x} = y - \int g \cdot p(g|y, \beta) dg \cong y - \sum_{k}^{K} \rho''_k(y) \cdot \mu''_{g,k} \quad (25)$$

When there is a spectral band where the harmonic structure of vowels is remarkable in a frame t of a voiced section, the confidence index $\beta_d$ of a corresponding band d will become greater. In that case, $\psi_k$ in equation (20) above becomes smaller, and the variance $\Sigma''_{y,k}$ of the band d, which is used in calculating the posterior probability $p''_k(y)$, becomes smaller than the original $\Sigma_{y,k}$. The smaller the variance, the sharper the normal distribution becomes. As a result, the band d has a greater influence on the likelihood of the overall posterior probability. This means that, in MMSE estimation, the contribution of a mel band corresponding to the spectral band where the harmonic structure of vowels is remarkable becomes great.

In contrast, when there is a spectral band where the harmonic structure of vowels is lost in the frame t of the voiced section, the confidence index $\beta_d$ of the corresponding band d will become smaller. In that case, $\psi_k$ in equation (20) above becomes greater, and the variance $\Sigma''_{y,k}$ of the band d, which is used in calculating the posterior probability $p''_k(y)$, becomes greater than the original $\Sigma_{y,k}$. The greater the variance, the broader the normal distribution becomes. As a result, the band d has a smaller influence on the likelihood of the overall posterior probability. This means that, in MMSE estimation, the contribution of a mel band corresponding to the spectral band where the harmonic structure of vowels is lost becomes small.

In short, the present invention has the following advantageous effects by adopting the two-factor model $p(g|y, \beta)$ as the probability model serving as a target of MMSE estimation. That is, according to the present invention, each band influences the result of MMSE estimation, with a degree of contribution in accordance with the level of its confidence. As a result, the output of the front-end is optimized.

The present invention has been described on the basis of the second method, which is adopted by Segura. Needless to say, the present invention is applicable to the first method, which directly estimates a clean speech estimated value from observation speech.

When the present invention is applied to the first method, the probability distribution serving as a target of MMSE estimation is defined as the two-factor model $p(x|y, \beta)$, and $p(x|y, \beta)$ is represented as the product of two probability distributions $p(x|y)$ and $p(x|\beta)$ as indicated in equation (26) below. In equation (26) below, $p(x|y)$ is a probability model of clean speech x generated in accordance with an appropriate algorithm, and $p(x|\beta)$ is a probability model of clean speech x with the confidence index $\beta$ as a factor.

When the present invention is applied to the first method, the probability model $p(x|\beta)$ is designed so that, the greater the value of the confidence index $\beta$ becomes, the higher the probability of the clean speech x=y becomes. That is, the probability model $p(x|\beta)$ is modeled as a normal distribution represented by equation (27) below, that is, a normal distribution in which the mean is the observed value y and the variance is an output of the function $\psi(\beta)$, and an appropriate function that outputs a smaller value as the value of the confidence index $\beta$ is greater is adopted as the function $\psi(\beta)$. The estimated value of MMSE estimation is given by equation (28) below:

[Eq. 26, 27 and 28]

$$p(x|y, \beta) = p(x|y)p(x|\beta) \quad (26)$$

$$p(x|\beta) = N(x; y, \psi(\beta)) \quad (27)$$

$$\hat{x} = \int x \cdot p(x|y, \beta) dx \cong \sum_{k}^{K} \rho''_k(y) \cdot \mu''_{x,k} \quad (28)$$

For the remainder, see the description of the second method. Those skilled in the art will easily understand that advantageous effects that are the same as or similar to those achieved in the case of the second method are achieved when the present invention is applied to the first method.

Figure 4:
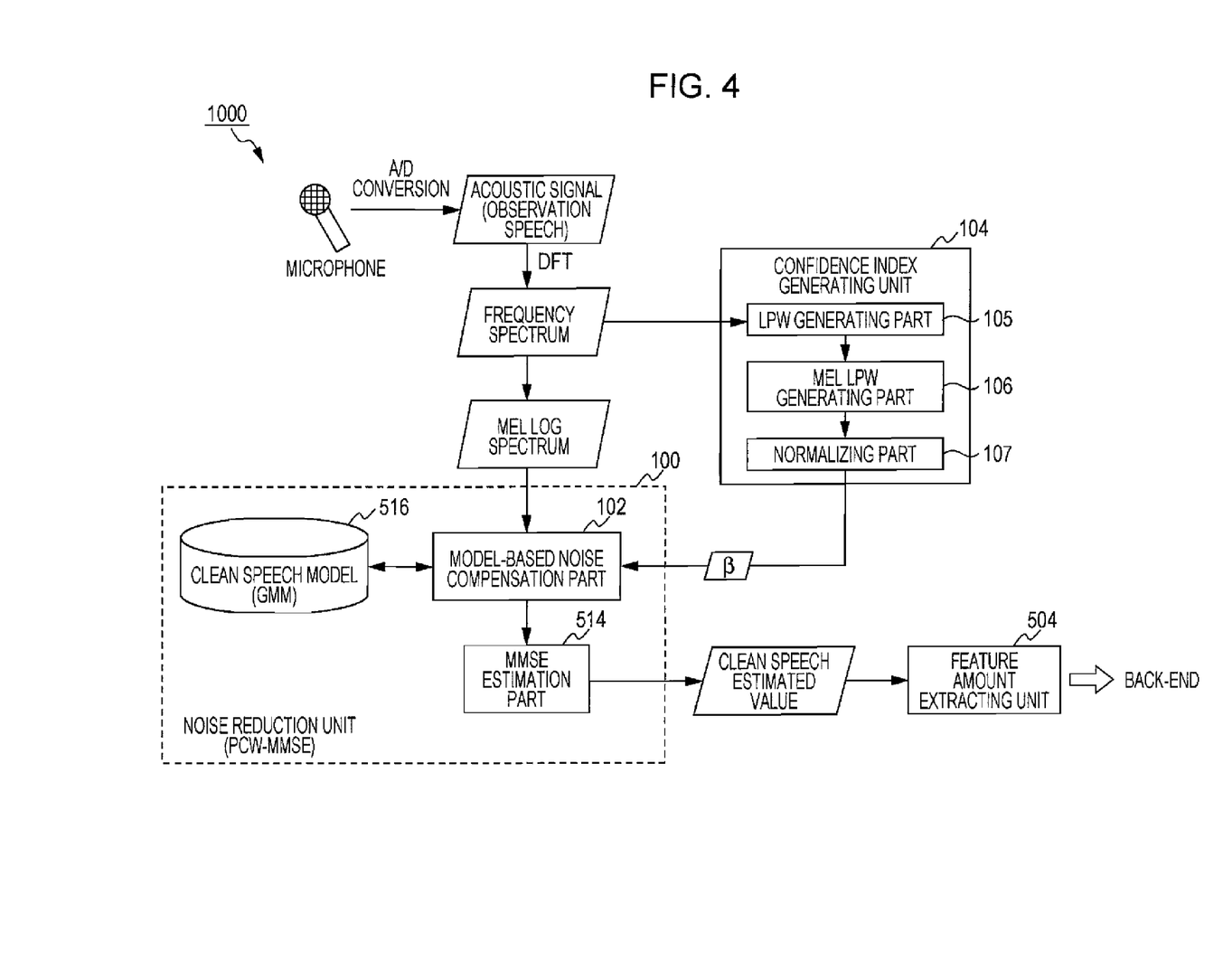
FIG. 4 is a conceptual diagram illustrating the configuration of a front-end in a speech recognition system of an embodiment.

FIG. 4 conceptually illustrates the configuration of a front-end 1000 in a speech recognition system according to an embodiment of the present invention. A noise reduction unit 100 of the front-end 1000 implements PCW-MMSE. The front-end 1000 further includes a confidence index generating unit 104. The confidence index generating unit 104 includes an LPW generating part 105, a mel LPW generating part 106, and a normalizing part 107. Hereinafter, a process executed by the front-end 1000 will be described on the basis of a flowchart illustrated in FIG. 5. Note that, in the following description, reference will be appropriately made to FIG. 4.

Figure 5:
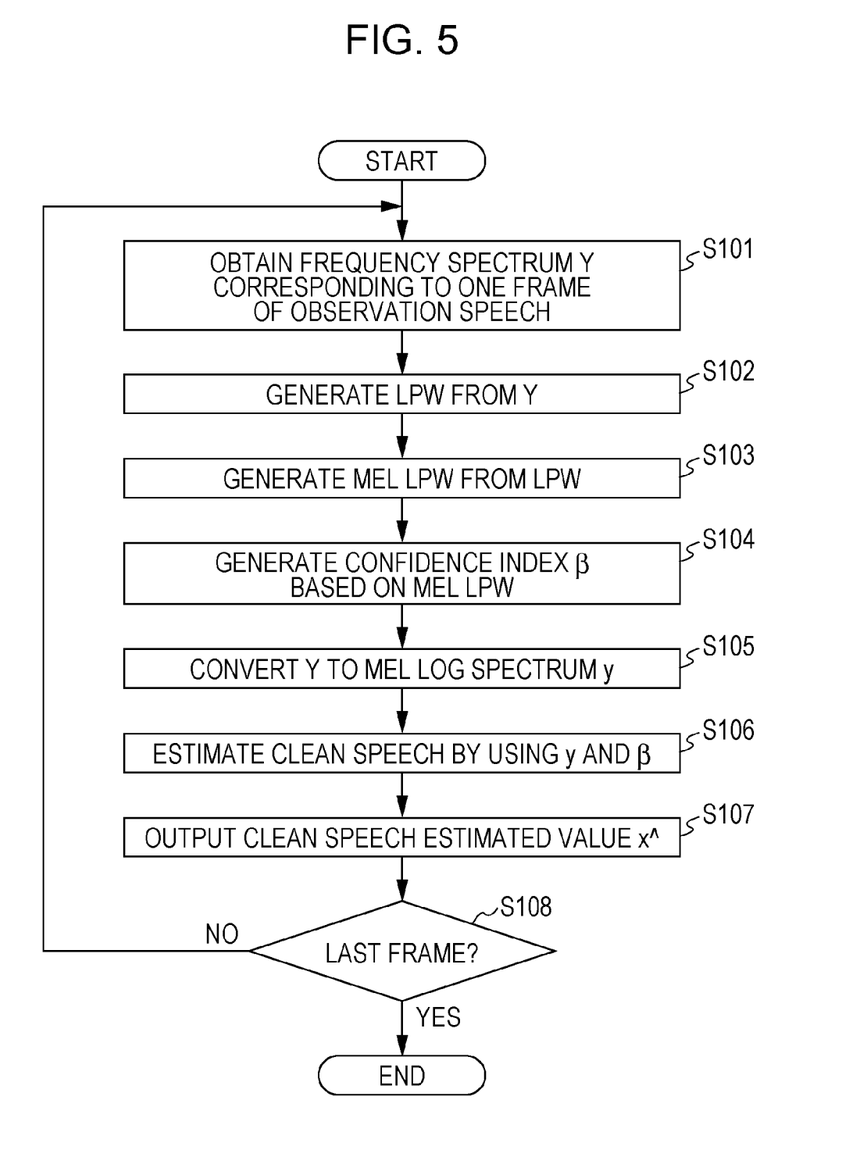
FIG. 5 is a flowchart illustrating a process executed by the front-end of the embodiment.

Firstly, when the frequency spectrum Y corresponding to one frame of observation speech is obtained (step S101), the LPW generating part 105 extracts the harmonic structure of the frequency spectrum Y and generates an LPW (step S102). Next, the mel LPW generating part 106 generates a mel LPW from the LPW (step S103). The normalizing part 107 normalizes the mel LPW with an appropriate method, and generates a confidence index $\beta$ for each band (step S104). The confidence index generating unit 104 provides the generated confidence index $\beta$ to the noise reduction unit 100.

Thereafter, the frequency spectrum Y corresponding to one frame is converted to a mel log spectrum y (step S105) and is input to the noise reduction unit 100. The noise reduction unit 100 estimates clean speech by using the input mel log spectrum y, and the confidence index $\beta$ provided from the confidence index generating unit 104 (step S106). At this time, a model-based noise compensation part 102 generates a probability model represented as the product of the probability distribution of the mismatch vector g (or clean speech x) with the observed value y as a factor and the probability distribution of the mismatch vector g (or clean speech x) with the confidence index $\beta$ as a factor. The MMSE estimation part 514 executes MMSE estimation on the probability model generated by the model-based noise compensation part 102, and estimates a clean speech estimated value $\hat{x}$.

The noise reduction unit 100 outputs the estimated clean speech estimated value $\hat{x}$ to the feature amount extracting unit 504 (step S107). The feature amount extracting unit 504 extracts a certain feature amount from the clean speech estimated value $\hat{x}$ and sends the feature amount to the back-end. The above-described series of procedures is repeatedly executed for each frame of the observation speech (No in step 108). The process ends when the last frame is reached (Yes in step 108).

As has been described above, according to the present invention, each band influences the result of MMSE estimation, with a degree of contribution in accordance with the level of its confidence. Further, the higher the S/N ratio of observation speech, the more the output value becomes shifted to the observed value. As a result, the output of the front-end is optimized.

The present invention has been described with reference to the embodiment. However, the present invention is not limited to the above-described embodiment, and changes are included within the scope of the present invention as long as they have operations and advantageous effects of the present invention within the scope of an embodiment conceivable by those skilled in the art.

The functions of the above-described embodiment can be realized with a program product that is written in an object-oriented programming language such as C, C++, C#, or Java (registered trademark) and that is executable on an apparatus. The program product of the embodiment can be stored in an apparatus-readable recording medium, such as a hard disk drive, a CD-ROM, an MO, a DVD, a flexible disk, an EEPROM, or an EPROM, for distribution. Alternatively, the program product can be transferred via a network in an apparatus-readable format.

EXAMPLE

Hereinafter, the present invention will be more specifically described using an example. However, the present invention is not limited to the example described below.

A computer program product (PCW-MMSE) was generated to cause a computer to execute a method of the present invention disclosed above, and the performance of the computer program product was evaluated using an in-vehicle speech recognition evaluation framework provided by Information Processing Society of Japan (IPSJ).

An experiment was conducted using the in-vehicle speech recognition evaluation database CENSREC-3. An evaluation condition was Condition 3 that uses a remote microphone for both learning data and test data. A front-end that outputs various feature amounts necessary for the experiment was prepared and was applied to both the learning data and the test data. The feature amounts were in 39 dimensions including MFCC 12 dimensions+ΔMFCC 12 dimensions+ΔΔMFCC 12 dimensions+C0+ΔC0+ΔΔC0, and CMN in units of utterances was applied. The configuration of a back-end, such as the method of generating an acoustic model, was unchanged (Category 0).

A GMM of clean speech was learned using data collected and recorded with a close-talking microphone when the vehicle was idle. Feature amounts of the mel log spectrum in 24 dimensions were used, and the number of mixtures was 256.

Table 1 below collectively indicates the word correct accuracy (%) of the example program product (PCW-MMSE) and a comparative example program product (standard MMSE: MMSE of Segra). Note that "CENSREC-3 Baseline" is a baseline where no speech enhancement or noise reduction is performed.

TABLE 1

| Recording Environment of Evaluation Data | | Word Correct Accuracy (%) | | |
|---|---|---|---|---|
| Driving Velocity | In-vehicle Environment | CENSREC-3 Baseline | Standard MMSE | PCW-MMSE |
| Idling | Normal | 100.0 | 100.0 | 100.0 |
| | Hazard On | 99.4 | 97.9 | 98.2 |
| | Air Conditioning (Low) | 98.0 | 98.8 | 99.1 |
| | Air Conditioning (High) | 63.1 | 81.2 | 90.2 |
| | Open Window | 93.1 | 96.6 | 97.3 |
| | Mean | 90.7 | 94.9 | 97.0 |
| Low-speed Driving | Normal | 99.8 | 98.7 | 99.2 |
| | Air Conditioning (Low) | 96.8 | 97.8 | 97.9 |
| | Air Conditioning (High) | 69.3 | 84.5 | 90.8 |
| | Open Window | 80.8 | 82.5 | 88.4 |
| | Mean | 87.5 | 91.7 | 94.7 |
| High-speed Driving | Normal | 98.1 | 97.3 | 98.9 |
| | Air Conditioning (Low) | 94.8 | 96.2 | 98.1 |
| | Air Conditioning (High) | 64.8 | 83.8 | 89.8 |
| | Open Window | 49.0 | 61.5 | 70.4 |
| | Mean | 78.8 | 86.1 | 90.4 |
| All-environment Mean | | 85.2 | 90.5 | 93.7 |

On the basis of the all-environment mean of the word correct accuracy (%) indicated in Table 1 above, the error reduction rate (%) with reference to the standard MMSE, which is a comparative example, was calculated using expression (26) below:

[Eq. 26]

$$\frac{\text{Correct accuracy rate (\%) of example} - \text{Correct accuracy rate (\%) of standard } MMSE}{100 - \text{Correct accuracy rate (\%) of standard } MMSE} \times 100 \quad (26)$$

As a result, the error reduction rate (%) of PCW-MMSE (example) was 33.8%. This result indicates that the method of the present invention greatly improves the speech recognition accuracy.

The invention claimed is:
1. A noise reduction method comprising:
   a step of generating a confidence index for each band on the basis of a spectrum of observation speech;
   a step of generating a probability model represented as a mixture multi-dimensional normal distribution having a dimension for each band, each normal distribution being represented as a product of a first normal distribution and a second normal distribution; and
   a step of estimating a mismatch vector estimated value by executing MMSE estimation on the probability model, and deriving a clean speech estimated value on the basis of the mismatch vector estimated value,
   wherein the first normal distribution is a probability distribution of a mismatch vector generated based on the observation speech, and
   wherein the second normal distribution has a zero mean, and a variance defined as a function that outputs a smaller value as the confidence index becomes greater.
2. The method according to claim 1, wherein the confidence index is an index representing remarkableness of a harmonic structure of the observation speech.

3. A noise reduction method comprising:
a step of generating a confidence index for each band on the basis of a spectrum of observation speech;
a step of generating a probability model represented as a mixture multi-dimensional normal distribution having a dimension for each band, each normal distribution being represented as a product of a first normal distribution and a second normal distribution; and
a step of deriving a clean speech estimated value by executing MMSE estimation on the probability model,
wherein the first normal distribution is a probability distribution of clean speech generated based on the observation speech, and
wherein the second normal distribution is has an observed value as a mean, and a variance defined as a function that outputs a smaller value as the confidence index becomes greater.

4. The method according to claim 3, wherein the step of generating a confidence index includes:
a step of extracting a harmonic structure from the spectrum of the observation speech and normalizing the harmonic structure;
a step of smoothing normalized values on a mel scale; and
a step of normalizing the smoothed values from 0 to 1.

5. A computer-executable program product for causing a computer to execute a method for noise reduction comprising: a step of generating a confidence index for each band on the basis of a spectrum of observation speech;
a step of generating a probability model represented as a mixture multi-dimensional normal distribution having a dimension for each band, each normal distribution being represented as a product of a first normal distribution and a second normal distribution; and
a step of estimating a mismatch vector estimated value by executing MMSE estimation on the probability model, and deriving a clean speech estimated value on the basis of the mismatch vector estimated value,
wherein the first normal distribution is a probability distribution of a mismatch vector generated based on the observation speech, and
wherein the second normal distribution has a zero mean, and a variance defined as a function that outputs a smaller value as the confidence index becomes greater.

6. A noise reduction apparatus comprising:
a confidence index generating unit configured to generate a confidence index for each band on the basis of a spectrum of observation speech; and
a noise reduction unit configured to generate a probability model represented as a mixture multi-dimensional normal distribution having a dimension for each band, each normal distribution being represented as a product of a first normal distribution and a second normal distribution, to estimate a mismatch vector estimated value by executing MMSE estimation on the probability model, and to derive a clean speech estimated value on the basis of the mismatch vector estimated value,
wherein the first normal distribution is a probability distribution of a mismatch vector generated on the basis of the observation speech, and
wherein the second normal distribution has a zero mean, and a variance defined as a function that outputs a smaller value as the confidence index becomes greater.

7. A noise reduction apparatus comprising:
a confidence index generating unit configured to generate a confidence index for each band on the basis of a spectrum of observation speech; and
a noise reduction unit configured to generate a probability model represented as a mixture multi-dimensional normal distribution having a dimension for each band, each normal distribution being represented as a product of a first normal distribution and a second normal distribution, and to derive a clean speech estimated value by executing MMSE estimation on the probability model,
wherein the first normal distribution is a probability distribution of clean speech generated on the basis of the observation speech, and
wherein the second normal distribution has an observed value as a mean, and a variance defined as a function that outputs a smaller value as the confidence index becomes greater.

8. The noise reduction apparatus according to claim 7, wherein the confidence index is an index representing remarkableness of a harmonic structure of the observation speech.

9. The apparatus according to claim 7, wherein the confidence index generating unit includes:
means for extracting a harmonic structure from the spectrum of the observation speech and normalizing the harmonic structure;
means for smoothing normalized values on a mel scale; and
means for normalizing the smoothed values from 0 to 1.

* * * * *